United States Patent [19]

Kato

[11] Patent Number: 5,685,627

[45] Date of Patent: Nov. 11, 1997

[54] HEADLAMP FOR A VEHICLE

[75] Inventor: Hideyuki Kato, Nishio, Japan

[73] Assignee: Nippondenso Co., Ltd., Kariya, Japan

[21] Appl. No.: 560,031

[22] Filed: Nov. 17, 1995

[30] Foreign Application Priority Data

Dec. 12, 1994 [JP] Japan ................... 6-307947

[51] Int. Cl.$^6$ ................... F21V 8/00; B60Q 1/04
[52] U.S. Cl. ................... 362/32; 362/61; 362/307; 362/351
[58] Field of Search ................... 362/32, 61, 311, 362/319, 320, 351, 355, 307, 308; 385/31, 33, 901

[56] References Cited

FOREIGN PATENT DOCUMENTS

| 623780 | 11/1994 | European Pat. Off. . |
| 2240780 | 2/1974 | Germany . |
| 4320554 | 12/1993 | Germany . |
| 6-68702 | 3/1993 | Japan . |

*Primary Examiner*—Thomas M. Sember
*Attorney, Agent, or Firm*—Cushman, Darby & Cushman IP Group of Pillsbury Madison & Sutro LLP

[57] ABSTRACT

Visibility of a distant area illuminated by a headlamp of a vehicle having a centralized light source type is improved. The headlamp for the vehicle include a light source, an optical cable emitting an incident light from the light source, lens bodies forming the incident light from the optical cable into a desired light distribution and irradiating the incident light ahead of the vehicle. The lens bodies have lens-shaped outgoing light surfaces where focal points are located in the vicinity of the incident light surfaces of the lens bodies, and the lens bodies have reflective surfaces $R_1$ and $R_2$ reflecting the incident light toward an outgoing light surfaces. The light axis X of the optical cable is tilted by a predetermined angle $\alpha$ with respect to the reflective surfaces $R_1$ and $R_2$.

14 Claims, 5 Drawing Sheets

F I G. 1
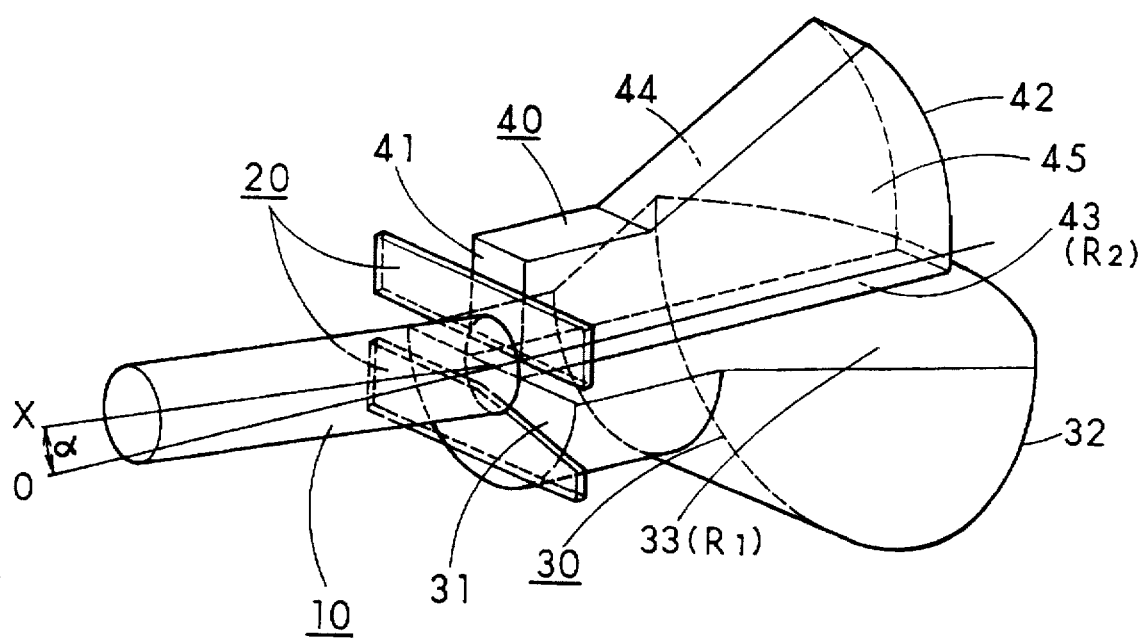

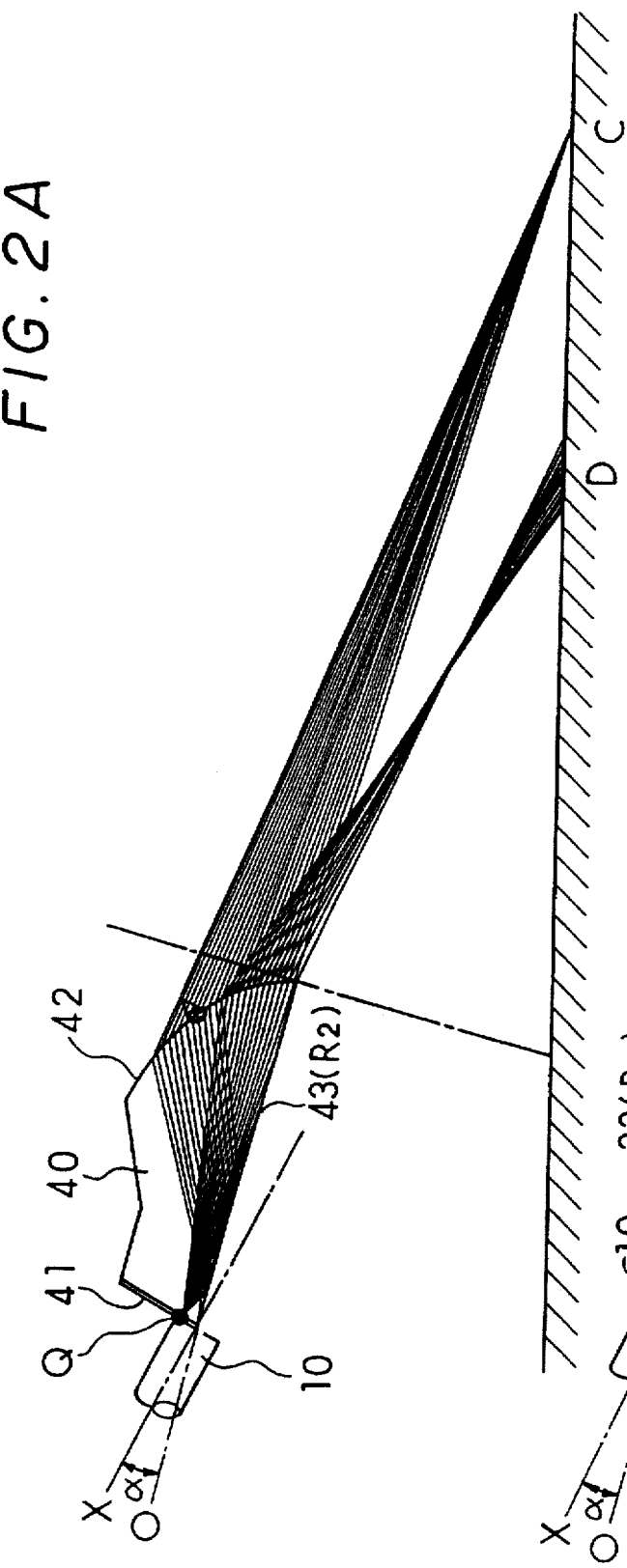
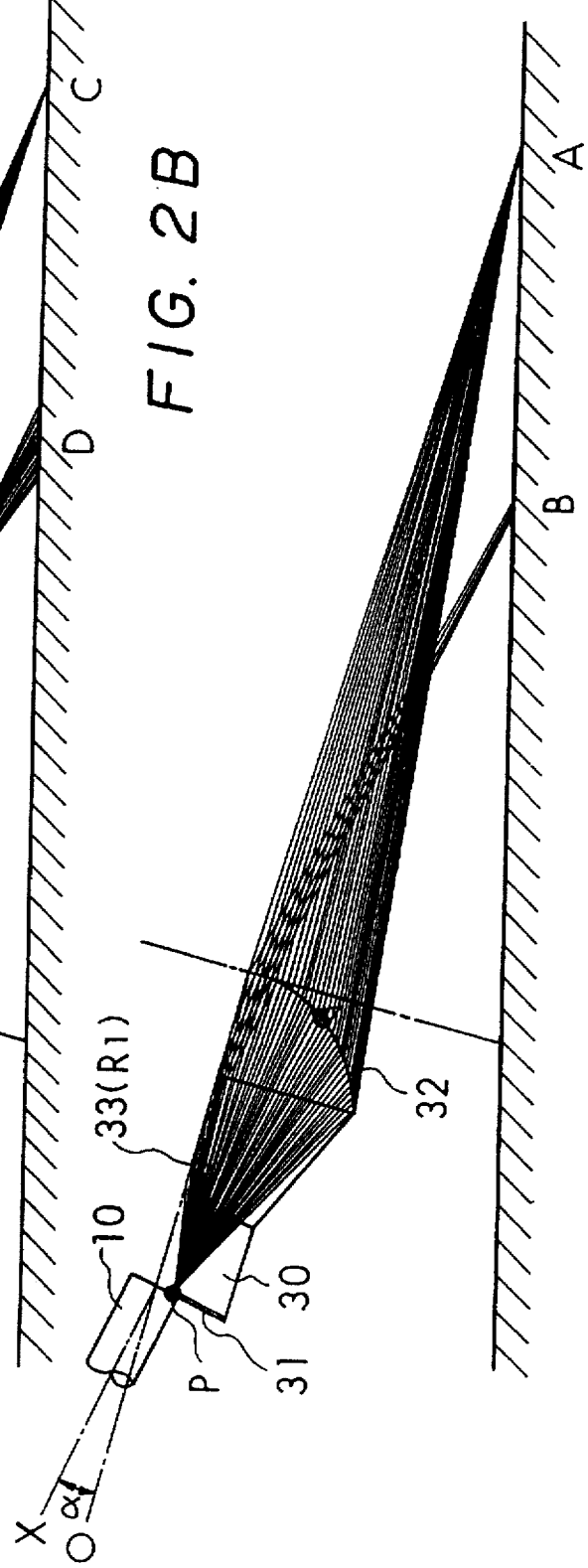
FIG. 2A
FIG. 2B

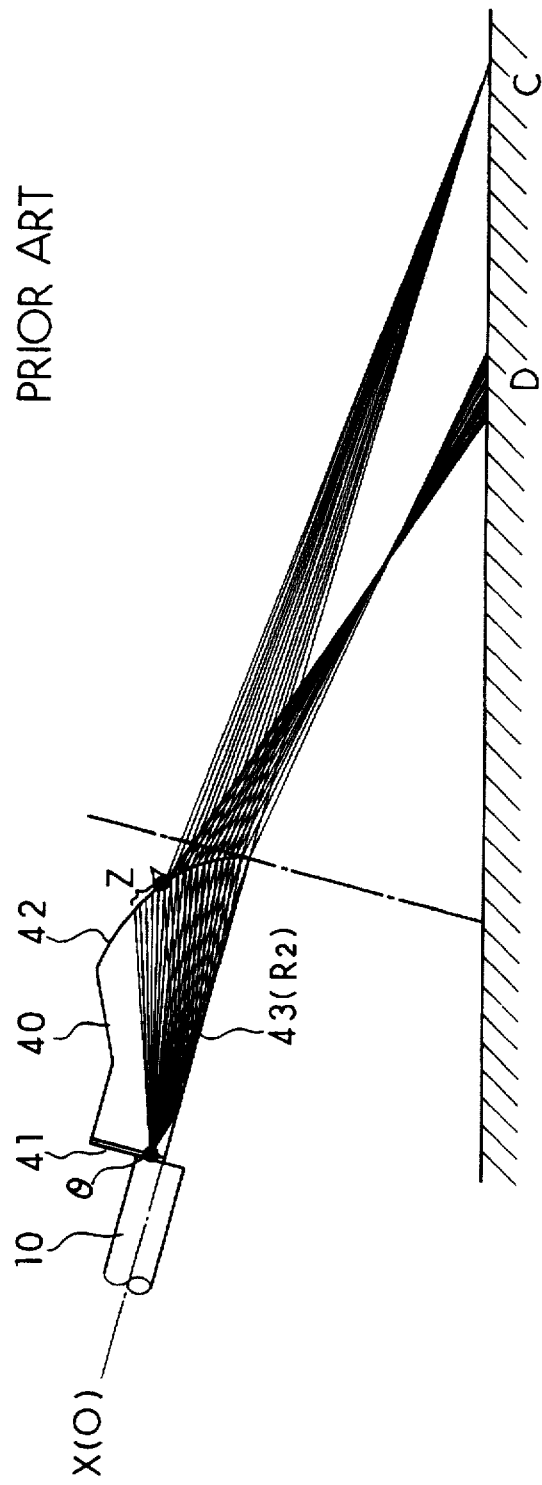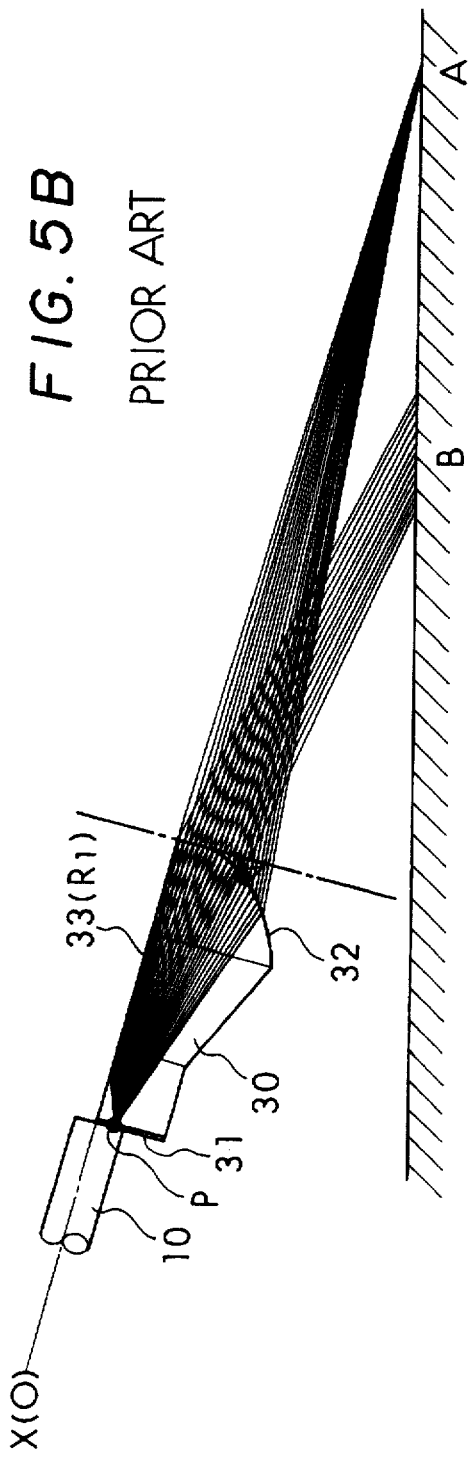
FIG. 5A PRIOR ART
FIG. 5B PRIOR ART

HEADLAMP FOR A VEHICLE

CROSS REFERENCE TO RELATED APPLICATIONS

This application is based upon and claims priority of Japanese Patent Application No. 6-307947 filed on Dec. 12, 1994, incorporated herein by reference.

BACKGROUND OF THE INVENTION

1. Field of the Invention

The present invention relates to a headlamp for a vehicle, to be more specific, a headlamp illuminating a distant area in the travelling direction of a vehicle.

2. Description of Related Art

As a headlamp for a vehicle, it has been proposed to utilize, as a light source, a discharge tube combined with a control circuit for the discharge tube to achieve efficient light intensity. Since the control circuit is expensive, a device has been proposed where the discharge tube is placed at one position in a vehicle as a centralized light source and luminous flux is guided by optic fibers from that position to the positions of right and left headlamps in the front part of a vehicle. One such example is proposed in Japanese Patent Application Laid-Open Publication No. 6-68702 by the assignee of this application. FIG. 3 shows one example of the structure of proposed headlamps, which comprise primarily a centralized light source 1 placed at the center of the front part of a vehicle, and headlamps L and R fixed symmetrically on the right and left sides of the centralized light source 1. The centralized light source 1 has a substantially cylindrical casing, where a discharge tube 1a as a line light source is placed at the center in the axis direction of the casing. The labels FL and FR represent the left and right front wheels of the vehicle.

The left headlamp L comprises a lens body 2 installed at the left front edge of the vehicle and an optical cable 3 connecting the lens body 2 to the centralized light source 1 while the right headlamp R comprises a lens body 4 installed at the right front edge of the vehicle and an optical cable 5 connecting the lens body 4 to the centralized light source 1.

In the aforementioned lens bodies 2 and 4, two different lens bodies having different lens operation are used for each lens body to realize combination of two kinds of light distribution as shown in FIGS. 4A, 4B and 4C. That is, a first lens body 30 for hot zone light distribution shown in FIG. 4C which illuminates the front of the vehicle concentratedly and a second lens body 40 for flat light distribution shown in FIG. 4B which disperses light in the right and left directions of the vehicle are combined together as shown in FIG. 4A. The first lens body 30 for the hot zone light distribution is substantially conically shaped, spreading from an incident light surface 31 to an outgoing light surface 32. The outgoing light surface 32 is substantially sperical, having a focal point within the object thereof in the vicinity of the incident light surface 31. The shape of the first lens body 30 is in the shape of a half of a frustoconical body cut along a horizontal plane 33 passing the vicinity of the central axis of the cone.

The second lens body 40 for the flat light distribution has substantially vertical planes 44 and 45 at the both sides of its horizontal direction. An outgoing light surface 42 is substantially in the shape of an arc in the vertical direction and the second lens body 40 has a focal point thereof within the object in the vicinity of an incident light surface 41. The second lens body 40 is generally straight in the horizontal direction and has a rough cylindrical plane. The shape of the second lens body 40 is like a fan, cut along a plane 43 passing the vicinity of the central axis of the cylinder. The first lens body 30 and the second lens body 40 are combined by disposing each cut surfaces 33 and 43 face to face.

A shade 20 is inserted between respective lens bodies 30 and 40 and the optical cable 10. The shade 20 is a material to determine the shape of distributed light which is emitted from the outgoing light surfaces 32 and 42 of respective lens bodies 30 and 40.

As a result, the front illuminated area comprises an illuminated area where light disperses in the right and left directions with respect to the horizontal line H and converges only in the upper and lower directions with respect to the vertical center line V, namely, a flat light distribution area as shown in FIG. 4B, and an illuminated area where light condenses with respect to the horizontal line H and the vertical center line V, i.e., a hot zone light distribution area as shown in FIG. 4C. This type of light distribution is low beam light distribution used to prevent glaring against the on-coming vehicles running on the opposite lane, that is, dipped-beam light distribution. The enlarged upper left part of the hot zone light distribution area is for recognizing pedestrians. The enlarged lower left part of the same is formed as such because it incidentally becomes symmetrical by mirror reflection.

In the above-described structure, because the total reflective surface $R_1$ composed of the surface 33 of the lens body 30 is formed at the top of the lens body 30, and the total reflective surface $R_1$ is arranged in parallel to the light axis X of the optical cable 10, luminous flux is divided into two; the light to illuminate a distant area (for instance, an area 60 m ahead of the vehicle) of the vehicle and the light to illuminate a close area (for instance, an area 10 m ahead of the vehicle). Because the total reflective surface $R_2$ composed of the surface 43 of the lens body 40 is formed at the bottom of the lens body 40 and the total reflective surface $R_2$ is arranged in parallel to the light axis X of the optical cable 10, luminous flux is divided into two; the light to illuminate a distant area (for instance, an area 60 m ahead of the vehicle) of the vehicle and the light to illuminate a close area (for instance, an area 10 m ahead of the vehicle).

An experiment has been carried out to trace the beam of light which enters the respective lens bodies 30 and 40 and comes out of the outgoing light surfaces 32 and 42. FIGS. 5A and 5B show the results of the experiment.

In FIG. 5B, when light enters a point P on the incident light surface 31 on the first lens body 30 for the hot zone light distribution, the light does not reflect on the total reflective surface $R_1$ and a distant point A (for instance, an area 60 m ahead of the vehicle) is illuminated by the light directly emitted from the outgoing light surface 32. In FIG. 5A, when light enters a point Q on the incident light surface 41 on the second lens body 40 for the flat light distribution, the light illuminates a distant point C (for instance an area 60 m ahead of the vehicle) after being reflected once on the total reflective surface $R_2$.

According to the experiment for the first lens body 30, the result shows that 59% of the light which enters point P of the incident light surface 31 in the first lens body 30 for the hot zone light distribution illuminates the distant point A while 41% of the light illuminates the point B (for instance, 10 m ahead of the vehicle) close to the first lens body 30. The result of the experiment for the second lens body 40 has revealed that 43% of the light which enters point Q of the incident light surface 41 in the second lens body 40 illuminates the distant point C while 41% of the light illuminates the point D (for instance, 10 m ahead of the vehicle) close to the second lens body 40, and the remaining 16% is lost through total internal reflection; and change "40 and can not" to inside the lens body 40 and can not (Z portion in FIG. 5A).

The result of the experiment has clarified a problem that only approximately one half of the light entering the lens bodies 30 and 40 is used to illuminate an area distant from the lens bodies 30 and 40 when the light axis X of the optical cable 10 is arranged in parallel to the total reflective surfaces $R_1$ and $R_2$. Therefore the light to illuminate the distant area becomes insufficient, which causes a problem due to lower visibility at the distant area.

SUMMARY OF THE INVENTION

The present invention has an object to improve the visibility of a distant area of this sort of a headlamp for a vehicle.

The present invention is based on a finding that the angle between the reflective surface of a lens body and the light axis of an optical cable changes the rates between light to illuminate a distant area and light to illuminate a close area. According to the present invention, a lens body has a lens-shaped outgoing light surface which has a focal point near the incident light surface of the lens, and a reflective surface to reflect the incident light toward the outgoing light surface. A light axis of an optical cable is tilted with respect to the reflective surface of the lens body by a predetermined angle.

Preferably, the predetermined angle is set to 5–10 degrees.

Preferably, the lens body is composed of a first lens body for providing a hot zone light distribution and a second lens body for providing a flat light distribution. The surfaces of the respective lens bodies serve as the reflective surfaces of each lens body by disposing the first lens body for the hot zone light distribution below the second lens body for the flat light distribution.

More preferably, a material to determine the shape of emitted light distribution is interposed between the optical cable and the lens body.

BRIEF DESCRIPTION OF THE DRAWINGS

Additional objects and advantages of the present invention will be more readily apparent from the following detailed description of preferred embodiments thereof when taken together with the accompanying drawings in which:

FIG. 1 is a perspective view of main parts of a headlamp for a vehicle according to an embodiment of the present invention;

FIGS. 2A and 2B show the result of an experiment to trace the beam of light emitted from the headlamp for the vehicle in the present embodiment, with FIG. 2A showing the beam of light emitted from the second lens body and FIG. 2B showing the beam of light emitted from the first lens body;

FIGS. 5A and 5B show the result of an experiment to trace the beam of light emitted from the conventional headlamp for a vehicle in FIG. 3.

DETAILED DESCRIPTION OF THE PRESENTLY PREFERRED EXEMPLARY EMBODIMENT

Figure 3:
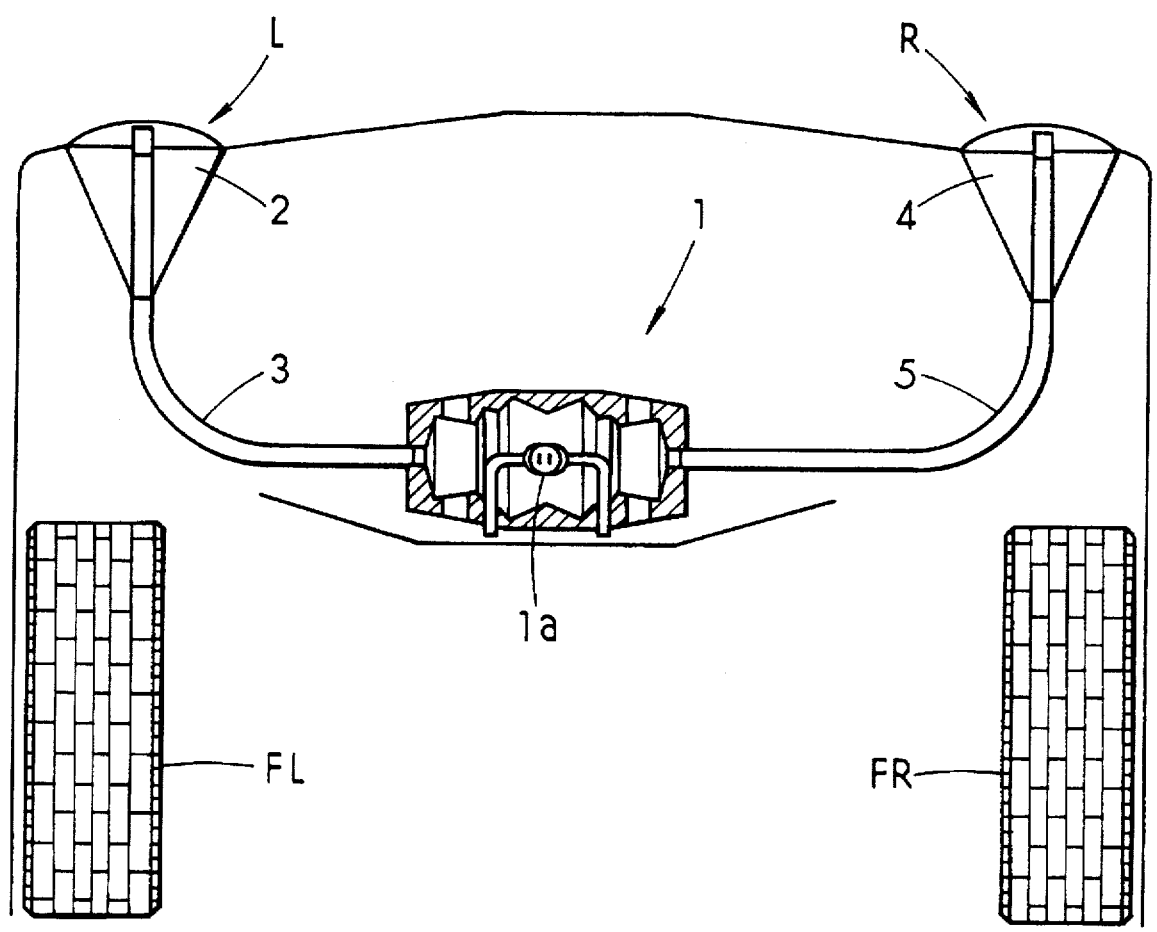
FIG. 3 shows a conventional apparatus of a headlamp in a centralized light source type for a vehicle.

A preferred embodiment of a headlamp for a vehicle according to the present invention is hereinafter described with reference to the accompanying drawings. FIG. 1 is a perspective view showing the main parts of the headlamp for a vehicle in the present embodiment. In regard to the headlamp for the vehicle of the present embodiment in FIG. 1, luminous flux emitted from the centralized light source (not shown but, for instance, refer to numeral 1 in FIG. 3) is guided via an optical cable 10 and enters a shade 20 which is a material to determine the distribution shape of the emitted light. The luminous flux emitted in a shape of predetermined light distribution by the shade 20 is designed to enter a first lens body 30 and a second lens body 40.

The optical cable 10 comprises a core made of the same material as the first lens body 30 and the second lens body 40 described below and a clad to coat the core. A refractive index of the material for the clad is smaller than a refractive index of the core in order to reflect all light inside the core. The light axis X of the optical cable 10 is so arranged as to tilt upward by $\alpha$ degree (for instance, $\alpha$=5–10 degrees) relative to the lens central axis of the first lens body 30 and the second lens body 40. In the present embodiment the light axis tilts by 10 degrees ($\alpha$=10 degrees).

The shape (a shape having the diameter same as or larger than that of the cable) of the shade 20 covers the whole surface (A circular shape is shown in the figure) of the outgoing surface of the optical cable 10 and is formed into a proper shape for determining light distribution shape. The shade 20 is made of a material which is, for instance, metal and does not transmit light. The shade 20 is so shaped that the luminous flux coming out of the optical cable 10 travels straight therethrough and is formed in the shape of the shade while having practically sufficient light volume.

The first lens body 30 and the second lens body 40 are made of a high light transmissive material having a predetermined light refractive index with respect to the air in order to guide the light therethrough, for example, acrylic resin. To materialize the combination of two different kinds of light distribution, i.e., the hot zone light distribution and the flat light distribution, the lens body of the present embodiment is composed of a combination of two lens bodies having different lens operation.

The first lens body 30 is substantially frustoconically shaped, spreading from the incident light surface 31 to the outgoing light surface 32. The first lens body 30 has the outgoing light surface 32 shaped like a rough sphere (To be more precise, the shape is slightly aspherical to adjust an aberration) having a focal point within the object thereof in the vicinity of the incident light surface 31. The shape of the present embodiment is a half of a frustoconical body cut along a plane 33 passing the vicinity of the central axis of the cone.

The second lens body 40 has two substantially vertical planes 44 and 45 in both sides of the horizontal direction. The outgoing light surface 42 is roughly arc (To be more precise, it is slightly non-arc shape to adjust an aberration) in the vertical direction and the second lens body 40 has a focal point within the object thereof in the vicinity of the incident light surface 41. The second lens body 40 is almost straight in horizontal direction and has a roughly cylindrical plane. The shape of the second lens body 40 in the present embodiment is like a fan cut along a plane 43 passing the vicinity of the central axis of the cylinder.

The first lens body 30 and the second lens body 40 are combined by disposing each cut surfaces 33 and 43 face to face.

Since the cut surface 33 of the first lens body 30 serves as a total reflective surface $R_1$ for the luminous flux from the incident light surface 31, the shape of the luminous flux looks as if the lower half of the shade 20 is symmetrically added to the upper side when the luminous flux is emitted forward through the first lens body 30.

Since the cut surface 43 of the second lens body 40 serves as a total reflective surface $R_2$ for the luminous flux from the incident light surface 41, the shape of the luminous flux looks as if the upper half of the shade 20 is symmetrically added to the lower side when the luminous flux is emitted forward through the second lens body 40.

Since the first lens body 30 is a normal omnidirectional lens body, the luminous flux in symmetrically-added shape of the lower half of the shade 20 is enlarged as an inverted image without changing its shape and illuminates an area to form the hot zone light distribution. Since the second lens body 40 extends only in a vertical direction, the luminous flux in symmetrically-added shape of the upper half of the shade 20 is enlarged only in the vertical direction. In a horizontal direction, it becomes free dispersive emission of the luminous flux passing between the vertical planes 44 and 45. Thus, the luminous flux illuminates an area to form the flat light distribution where light disperses in the right and left directions and converges only in the upper and lower directions.

Figure 4A:
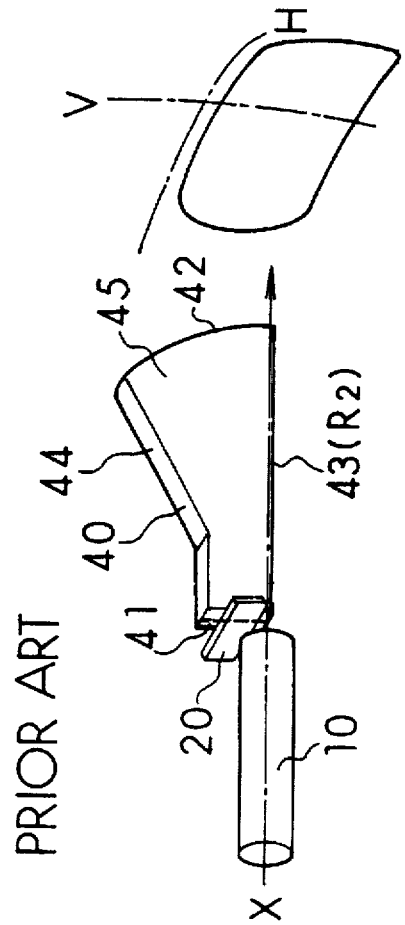
FIGS. 4A to 4C show the lens body in FIG. 3.
Figure 4B:
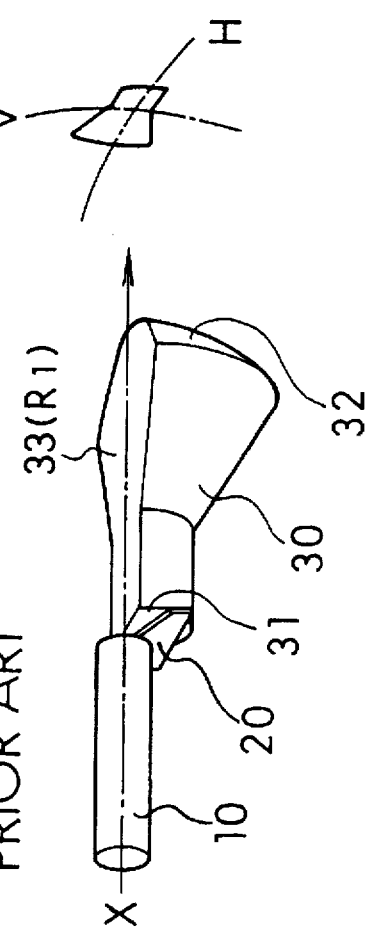
Figure 4C:
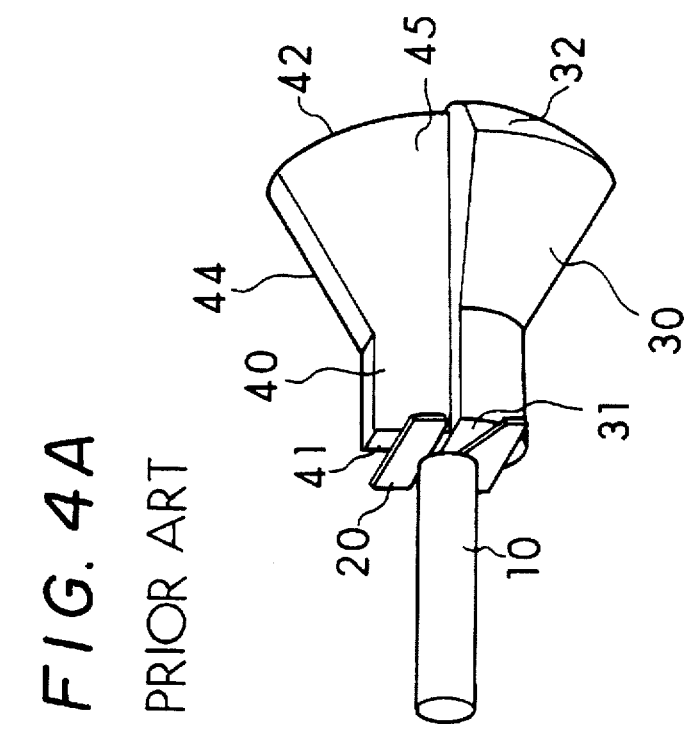

As a result, the front illuminated area is composed of a centralized illuminated area, i.e., the hot zone light distribution area (FIG. 4C) and a dispersive illuminated area, i.e., the flat light distribution area (FIG. 4B) with respect to the horizontal line H and the vertical center line V. This type of light distribution is low beam light distribution used to prevent glaring against the on-coming vehicles running on the opposite lane, that is, dipped-beam distribution light. The enlarged upper left part of the hot zone light distribution area (FIG. 4C.) is formed for recognizing pedestrians. The enlarged lower left part of the same is formed as such because it incidentally becomes symmetrical by mirror reflection.

In the headlamp of the present embodiment having the above structure, light enters each lens body 30 and 40 via the optical cable 10 of which light axis X is tilted upward by 10 degrees ($\alpha=10$ degrees) with respect to the lens central axis O of the lens body composed of the first lens body 30 and the second lens body 40. An experiment in the same manner as in FIGS. 5A and 5B has been carried out to trace the beam of light which enters the respective lens bodies 30 and 40 and comes out of their outgoing light surfaces 32 and 42. FIGS. 2A and 2B show the result of the experiment.

In FIG. 2B, after being emitted from the optical cable 10 to point P on the incident light surface 31 (FIG. 1) of the first lens body 30 for the hot zone light distribution, the amount of the light reflected on the total reflective surface $R_1$ decreases compared with the amount in FIG. 5B where the lens central axis O coincides with its light axis X, since the light axis X is tilted upward by 10 degrees ($\alpha=10$ degrees) with respect to the lens central axis O. According to the experiment for the first lens body 30, the result shows that a distant point A (for instance, 60 m ahead of the vehicle) is illuminated by 85% of the light which entered point P on the incident light surface 31 of the first lens body 30 for the hot zone light distribution while remaining 15% of the light illuminates point B (for instance, 10 m ahead of the vehicle) close to the first lens body 30.

In FIG. 2A, after being emitted from the optical cable 10 to point Q on the incident light surface 41 (FIG. 1) of the second lens body 40 for the flat light distribution, the amount of the light reflected on the total reflective surface $R_2$ increases compared with the amount in FIG. 5A where the lens central axis O coincides with its light axis X, since the light axis X is tilted upward by 10 degrees ($\alpha=10$ degrees) with respect to the lens central axis O. The result of the experiment for the second lens body 40 has revealed that a distant point C (for instance, 60 m ahead of the vehicle) is illuminated by 69% of the light which has entered point Q on the incident light surface 41 of the second lens body 40 for the flat light distribution while remaining 31% of the light illuminates point D (for instance, 10 m ahead of the vehicle) close to the second lens body 40.

Accordingly, illumination and thus visibility of the distant area is improved; because the light for the distant area (light to illuminate points A in FIGS. 2B and 5B) emitted from the outgoing light surface 31 of the first lens body 30 for the hot zone light distribution increases from 59% to 85% and the light for the distant area (light to illuminate points C in FIGS. 2A and 5A) emitted from the outgoing surface 41 of the second lens body 40 for the flat light distribution increases from 43% to 69% as shown in the table below, if the light axis X of the optical cable 10 is tilted upward by 10 degrees ($\alpha=10$ degrees) with respect to the lens central axis O according to the present embodiment, compared with a case were the lens central axis O coincides with the light axis X ($\alpha=0$ degree).

| Angle ($\alpha$) | Ratio of Light to Illuminate Distant Area | |
|---|---|---|
| | Lens Body for Hot Zone Light Distribution | Lens Body for Flat Light Distribution |
| 0 Degree | 59% | 43% |
| 10 Degree | 85% | 69% |

The above experimental result shows a case where the light axis X of the optical cable 10 is tilted upward by 10 degrees with respect to the lens central axis O. A desirable angle between the light axis X of the optical cable 10 and the lens central axis O is 5–10 degrees ($\alpha=5-10$ degrees) because the reflective light does not increase enough to raise the amount of the light for the distant area if the angle is under 5 degrees and if it exceeds 10 degrees, the reflective light increases as well as the light for the distant area; however, the light tends to illuminate the lower surface of the first lens body 30 and the upper surface of the second lens body 40. Therefore the amount of wasted light increases.

Since the light axis X of the optical cable 10 is tilted upward by the predetermined angle ($\alpha=5-10$ degrees) with respect to the lens central axis O, the reflected light on each reflective surface 33 and 44 of each lens body 30 and 40, respectively can illuminate the area distant from the lens bodies 30 and 40 according to the present embodiment having the above-described structure. Thus, a headlamp for a vehicle having improved visibility at a distant area is achieved. By setting the above predetermined angle to 5–10 degrees, more light can be projected toward the distant area without making the lens diameter of each lens body 30 and 40 larger and without wasting the light. Accordingly, the present improved automobile headlamp is provided inexpensively.

The present invention should not be limited to the above-described embodiment but may be modified in many other ways without departing from the spirit of the invention.

What is claimed is:

1. A headlamp for a vehicle having a light source, an optical cable for transmitting light from said light source, said optical cable having a light axis, a lens body for emitting said light in a forward direction of said vehicle, said lens body comprising:

an incident light surface coupled with said optical cable for receiving said light transmitted by said optical cable;

an outgoing light surface forming a focal point thereof in a vicinity of said incident light surface; and a reflective surface for reflecting at least a portion of said light received by said incident light surface toward said outgoing light surface, wherein:

said light axis of said optical cable is tilted by a predetermined angle relative to said reflective surface so that said outgoing light surface projects both light passing from said incident light surface without reflection and said portion of said light reflected by said reflective surface to illuminate a distant area in said forward direction of said vehicle.

2. A headlamp for a vehicle according to claim 1, wherein said predetermined angle is between 5 and 10 degrees.

3. A headlamp for a vehicle having a light source, an optical cable having a light axis for transmitting light from said light source, a lens body for emitting said light from said optical cable ahead of said vehicle, wherein said lens body comprises:

an incident light surface coupled with said optical cable for receiving said light transmitted by said optical cable;

an outgoing light surface forming a focal point thereof in a vicinity of said incident light surface of said lens body; and a reflective surface for reflecting at least a portion of said light received by said incident light surface toward said outgoing light surface; wherein said light axis of said optical cable is tilted by a predetermined angle relative to said reflective surface, said lens body comprises a first lens body for hot zone light distribution and a second lens body for first flat light distribution;

said first lens body for said hot zone light distribution is disposed at a lower part in said lens body;

said second lens body for said flat light distribution is disposed at an upper part in said lens body; and a border of said first and second lens bodies forms said reflective surface.

4. A headlamp for a vehicle according to claim 3, wherein a shade is inserted between said optical cable and said lens body for determining light distribution shape of irradiated light.

5. An illuminating device comprising:

a light source directing light along a light axis; and a lens body for projecting light from said light source, wherein:

said lens body has a light incident surface, a light outgoing surface projecting the light incident from said incident surface and a light reflective surface extending between said incident surface and said outgoing surface, said lens body constructed and arranged to project both direct light which travels from said incident surface to said outgoing surface without being reflected by said reflective surface and reflected light reflected by said reflective surface during travel from said incident surface to said outgoing surface, and said light axis of said light source is tilted by a predetermined angle to said reflective surface to thereby adjust a ratio of light intensities between the direct light and the reflected light.

6. An illuminating device according to claim 5, wherein:

said light source includes a centralized light source and a guide member disposed between said centralized light source and said incident surface to guide said light therethrough from said centralized light source to said incident surface;

an optical axis of said guide member is inclined by the predetermined angle relative to said reflective surface.

7. An illuminating device according to claim 6, wherein:

said guide member includes an optical cable for guiding the light therethrough.

8. An illuminating device according to claim 7, wherein:

said reflective surface extends generally horizontally; and the optical axis of said optical cable is inclined downward.

9. An illuminating device according to claim 5, wherein:

said reflective surface extends along a central axis of said lens body; and an optical axis of said light source means tilts by the predetermined angle relative to the central axis.

10. An illuminating device according to claim 5, wherein:

said reflective surface extends generally horizontally; and an optical axis of said light source means is directed downward to project the light more toward a far point therefrom.

11. An illuminating device according to claim 10, wherein:

said lens body is disposed at a front portion of a vehicle.

12. An illuminating device comprising:

a light source means; and a lens body for projecting a light from said light source means, wherein:

said lens body is formed from a light transmitting material and has a light incident surface, a light outgoing surface projecting the light incident from said incident surface and a light reflective surface extending between said incident surface and said outgoing surface, said lens body being constructed and arranged to project both direct light which travels from said incident surface to said outgoing surface without being reflected by said reflective surface and reflected light reflected by said reflective surface during travel from said incident surface to said outgoing surface, said light source means provides said light to said incident surface in a direction tilted by a predetermined angle relative to said reflective surface thereby to adjust a ratio of light intensities between the direct light and the reflected light, said light source means includes a light source and a guide member disposed between said light source and said incident surface to guide said light therethrough from said light source to said incident surface, an optical axis of said guide member is inclined by the predetermined angle relative to said reflective surface, said guide member includes an optical cable for guiding the light therethrough, said reflective surface extends generally horizontally, said optical axis of said optical cable is inclined downwardly, said lens body includes a first lens body having said reflective surface at an uppermost portion thereof and a second lens body having said reflective surface at a lowermost portion thereof; and said first and second lens bodies are stacked to each other with said uppermost portion contacting said lowermost portion.

13. An illuminating device according to claim 12, wherein:

said first lens body concentratedly projects the light for providing a hot zone light distribution; and said second lens body projects the light for providing a horizontally extending flat light distribution.

14. A headlamp for a vehicle having a light source, an optical cable for transmitting light from said light source, said optical cable having a light axis, and a lens body for emitting said light in a forward direction of said vehicle, said lens body comprising:

an incident light surface coupled with said optical cable for receiving said light transmitted by said optical cable;

an outgoing light surface forming a focal point thereof in a vicinity of said incident light surface; and a reflective surface for reflecting at least a portion of said light received by said incident light surface toward said outgoing light surface, wherein said light axis of said optical cable is tilted by a predetermined angle relative to said reflective surface and said outgoing light surface and said reflective surface are constructed and arranged to permit said outgoing light surface to project both said reflected portion of said received light and a portion of said received light that is not reflected by said reflective surface to an area forward of the vehicle.

* * * * *